US006532130B1

(12) United States Patent
Murari et al.

(10) Patent No.: US 6,532,130 B1
(45) Date of Patent: Mar. 11, 2003

(54) HEAD FOR READING MAGNETICALLY STORED DATA

(75) Inventors: Bruno Murari, Monza (IT); Benedetto Vigna, Potenza (IT); Paolo Ferrari, Gallarate (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 09/116,406

(22) Filed: Jul. 16, 1998

(30) Foreign Application Priority Data

Jul. 18, 1997 (EP) .............................. 97830369

(51) Int. Cl.⁷ .......................... G11B 5/596; G11B 5/33
(52) U.S. Cl. ............................. 360/77.06; 360/77.02; 360/313; 360/316
(58) Field of Search ................ 360/121, 119, 360/126, 77.02, 77.06, 313, 316

(56) References Cited

U.S. PATENT DOCUMENTS

| 4,837,924 A | | 6/1989 | Lazzari ........................ 29/603 |
| 4,954,920 A | | 9/1990 | Yamada et al. ............. 360/113 |
| 5,196,976 A | | 3/1993 | Lazzari ....................... 360/113 |
| 5,257,148 A | * | 10/1993 | Solhjell et al. .......... 360/77.06 |
| 5,420,736 A | | 5/1995 | Heim et al. ................. 360/113 |
| 5,477,405 A | | 12/1995 | Okada et al. ............... 360/121 |
| 5,555,142 A | * | 9/1996 | Komai et al. ............ 360/77.06 |
| 5,898,534 A | * | 4/1999 | Gray ....................... 360/77.06 |
| 6,157,510 A | * | 12/2000 | Schreck et al. .......... 360/77.06 |

FOREIGN PATENT DOCUMENTS

| EP | 0478 256 | 4/1992 |
| JP | 61 210512 | 9/1986 |
| JP | 62 020121 | 1/1987 |
| JP | 63 053711 | 3/1988 |
| JP | 63 138515 | 6/1988 |
| JP | 01 264619 | 10/1989 |
| JP | 02 087313 | 3/1990 |
| JP | 06 215322 | 8/1994 |

* cited by examiner

Primary Examiner—Andrew L. Sniezek
(74) Attorney, Agent, or Firm—Jenkens & Gilchrist, P.C.

(57) ABSTRACT

A head (130) for a disk storage device having a plurality of tracks (117) divided into memory cells (234), including a magnetic circuit (205, 230a, 230b, 250a, 250b) for reading the memory cells (234) in succession, the magnetic circuit (205, 230a, 230b, 250a, 250b) for reading the memory cells (234) including at least two partial reading components (206a, 230a, 250a; 206b, 230b, 250b) each for reading a portion (234a; 234b) of each memory cell (234), the portions (234a; 234b) being arranged transversely relative to the longitudinal axis (233) of the corresponding track (117).

30 Claims, 4 Drawing Sheets

HEAD FOR READING MAGNETICALLY STORED DATA

FIELD OF THE INVENTION

The present invention relates to a head for a disk storage device.

BACKGROUND OF THE INVENTION

In disk storage devices such as, for example, hard disks, the data is stored in tracks concentric with a rotation axis of the disk. A block of data is accessed (for reading or writing) by the positioning of an electromagnetic head mounted on a suspension arm adjacent the desired track.

A problem with disk storage devices is that, to ensure that they operate correctly, it is necessary for the head to be positioned extremely precisely within the track. Otherwise, the head may move over an adjacent track during a writing operation, destroying at least some of the data stored; similarly, during a reading operation, the head may detect incorrect data.

A known, dedicated solution for correcting the position of the head consists of the use of a servo-disk on which auxiliary positioning data (servo data) is recorded. A further servo-head fixed to the reading and writing head (or to a group of heads) reads the servo-data, enabling a servo-mechanism to keep all of the heads in the correct position within the track. This solution is extremely expensive since it requires the use of a suitable servo-disk and servo-head. Moreover, the control thus achieved is not very precise and is affected, in particular, by the different thermal expansion of the servo-head and of the servo-disk in comparison with the heads and the disks on which the useful data is stored.

A different, embedded solution is commonly used and consists in storing the auxiliary positioning servo-data on each track, intercalated with the useful data. In particular, each track is divided into various sectors, some of which are used for storing the positioning servo-data at regular intervals. When the disk is rotating, each head reads the auxiliary servo-data periodically, enabling the servo-mechanism to correct its position directly.

A disadvantage of this solution is that, during the movement of the head between two consecutive sectors containing servo-data, it is not possible to check and correct its position in any way; this structure does not therefore ensure the correct position of the head continuously. Moreover, the storage of the positioning servo-data on every track of the disk involves a considerable wastage, on the order of 10%, of the useful space on the disk.

The object of the present invention is to avoid the aforementioned drawbacks.

SUMMARY OF THE INVENTION

The head according to the present invention enables its position to be checked and corrected directly and continuously. This is particularly useful when the disk storage device is subject to knocks and vibrations as, for example, in portable devices.

This structure enables the head to follow the track extremely precisely; narrower tracks disposed closer together can thus be used, enabling storage devices with a greater data density to be produced.

The solution of the present invention does not require a dedicated device (a servo-disk or a servo-head) and is therefore extremely inexpensive. In addition, the present invention does not require the storage of any positioning servo-data, consequently avoiding wastage of space on the disk.

Further characteristics and advantages of the head according to the present invention will become clear from the following description of a preferred embodiment thereof, given by way of non-limiting example, with reference to the appended drawings.

DETAILED DESCRIPTION OF A PREFERRED EMBODIMENT

Figure 1:
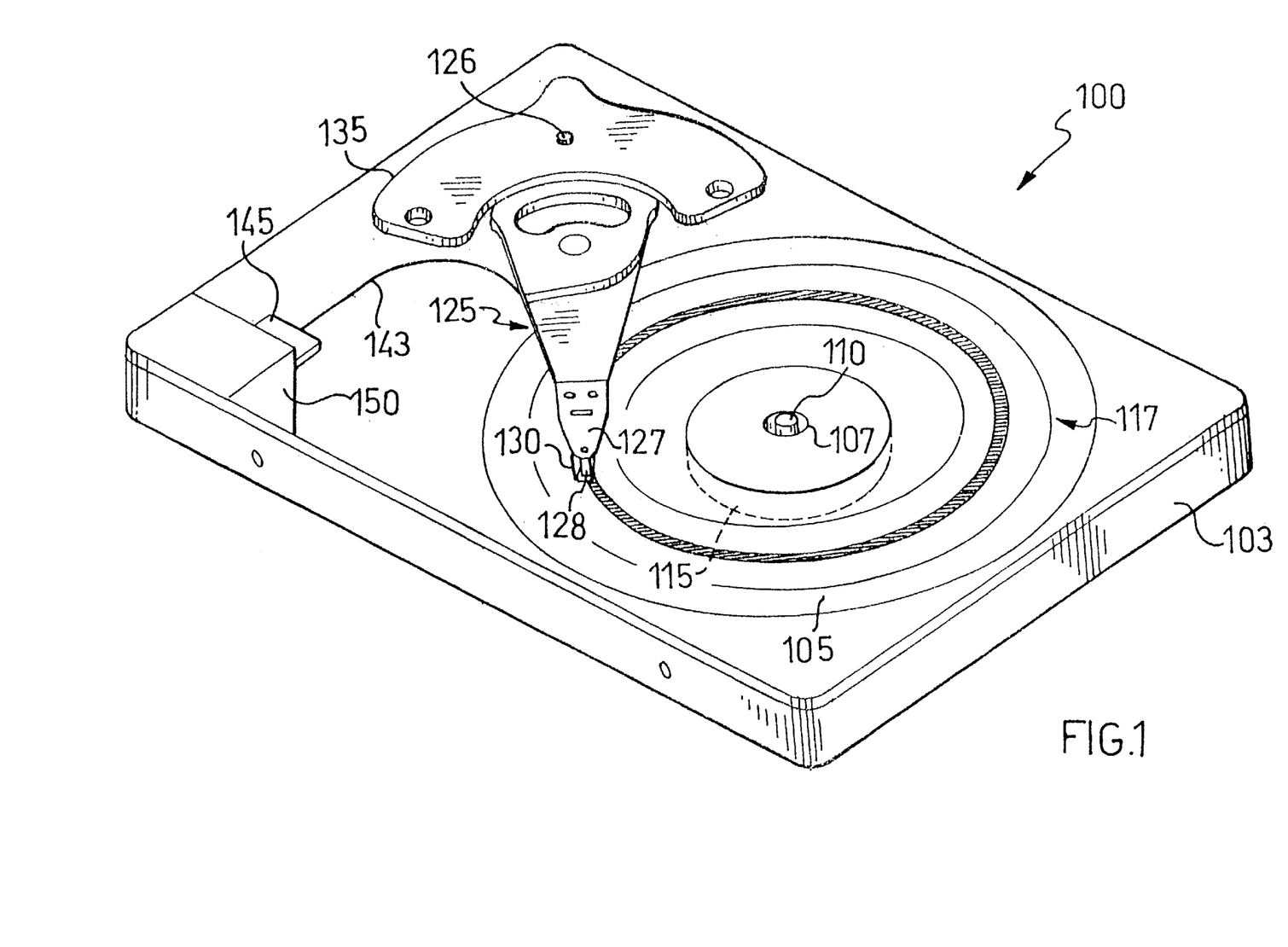
FIG. 1 shows, schematically and in section, a hard-disk storage device in which the head of the present invention can be used.

With reference in particular to FIG. 1, a hard-disk storage device 100 includes a sealed container 103, inside which there is a disk 105 constituted by a rigid circular support covered with a ferromagnetic material. The head of the present invention also is suitable for use in a multiple-disk, floppy-disk, or optical-disk storage device and the like. The disk 105 is coupled by means of a hub 107 to a shaft 110 connected to a suitable electric motor 115. The motor 115 keeps the disk 105 rotating about the shaft 110 at a constant frequency (for example of between 100 and 150 Hz).

The disk 105 comprises a plurality of tracks 117 concentric with the rotation shaft 110 and divided into memory cells. Each cell stores one bit of data, represented by different magnetization states of the ferromagnetic material. Typically, the density of data along a track 117 is, for example, of the order of 120,000 BPI (bits per inch), and the track density is, for example, of the order of 5,000 TPI (track per inch).

The storage device 100 includes a suspension arm 125 coupled at one of its ends to a pin 126. The suspension arm 125 terminates in a flexible suspension 127 on the free end of which a slider 128 is mounted. The slider 128 supports an electromagnetic head 130 (described in detail below). The suspension 127 bends to exert a pressure which urges the slider 128 against the upper surface of the disk 105. The slider 128 hovers on an air cushion above an upper surface of the disk 105 when the disk 105 is in rotation, allowing the head 130 to follow the roughness of the disk 105 at an extremely small distance, for example, of a few tens of nm.

An actuator 135, typically constituted by a voice coil motor of the type used in loudspeakers, rotates the suspension arm 125 about the pin 126. The head 130 is thus moved in a substantially radial direction relative to the disk 105 so as to be positioned over the desired track.

The head 130 is connected by means of a flexible wire 143 to an analog/digital circuit 145 formed in a chip of semiconductor material. The circuit 145 processes an electrical signal supplied by the head 130 during a reading operation and sends suitable control signals to the head 130 during a writing operation. The circuit 145 is connected to a control unit 150 which puts the storage device 100 into communication with the exterior. The unit 150 also is connected to the actuator 135 in order to control the movement of the head 130 over the desired track and to check the position of the head 130 within the track (as described in detail below).

Figure 2:
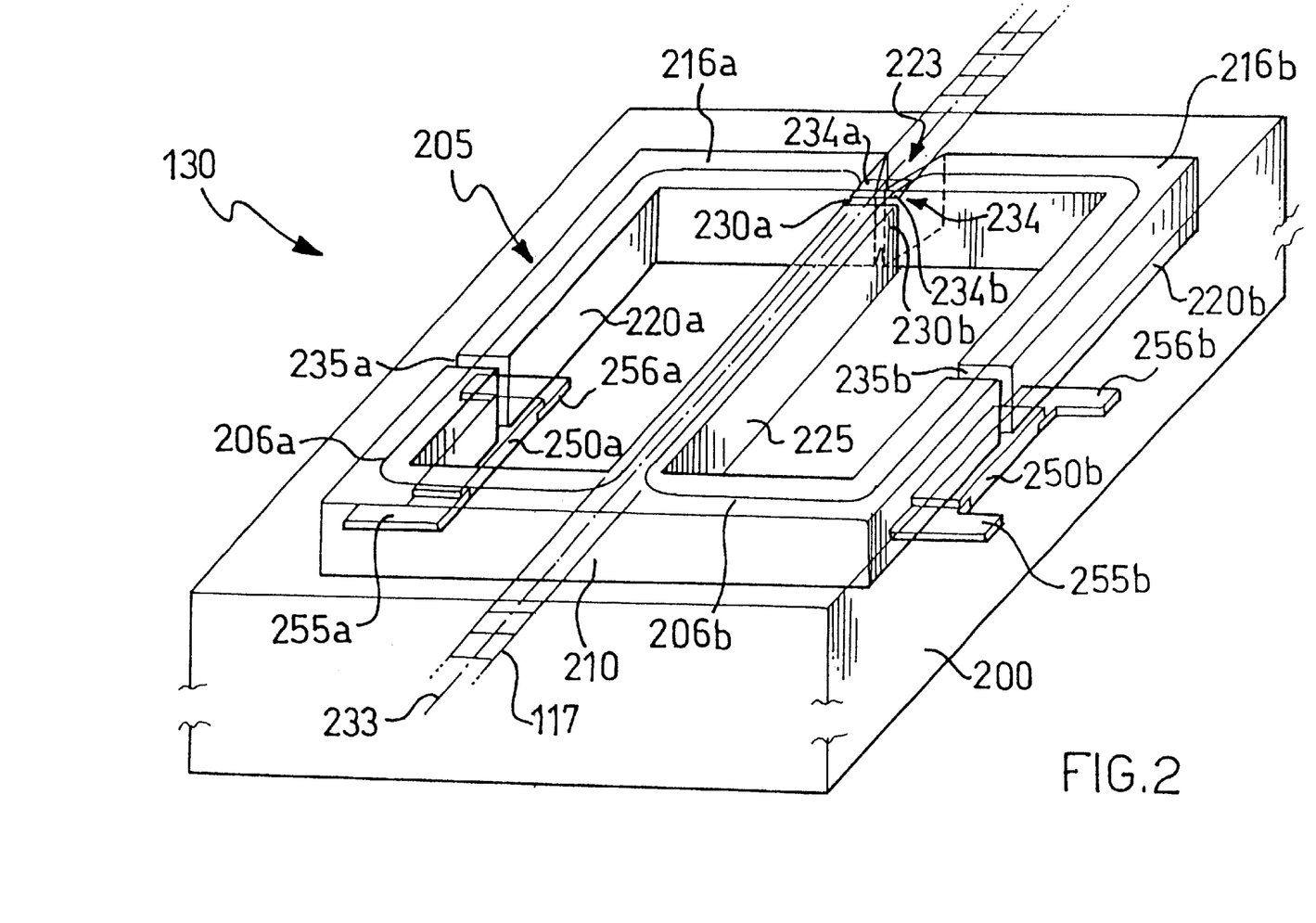
FIG. 2 is a partially-sectioned view of an embodiment of the head according to the present invention.

With reference now to FIG. 2 (the elements already shown in FIG. 1 are identified by the same reference numerals), the electromagnetic head 130 has a planar structure and is formed in a chip 200 of semiconductor material, typically silicon; the head of the present invention is, however, also suitable for being formed on a ceramic support or the like. The chip 200 includes a magnetic core 205 made of a material with high permeability, for example, permalloy (an alloy of nickel and iron) or other soft ferromagnetic materials, incorporated in a diamagnetic material.

The core 205 forms a left-hand magnetic circuit 206a and a right-hand magnetic circuit 206b each of which defines a preferred path for the flux lines of a magnetic field. The core 205 is constituted by a front yoke 210 and by a rear yoke divided into a left-hand portion 216a and a right-hand portion 216b which are separate from one another; a left-hand column 220a and a right-hand column 220b connect the front yoke 210 to the left-hand portion 216a and to the right-hand portion 216b of the rear yoke, respectively. The left-hand portion 216a and the right-hand portion 216b of the rear yoke have, at their respective free ends, opposed chamfers (for example 45o chamfers) which form a V-shaped opening 223 facing outwardly relative to the magnetic core 205. A central column 225 extends from the front yoke 210 as far as the vicinity of the opening 223 of the rear yoke. The left-hand magnetic circuit 206a is formed by the front yoke 210, by the central column 225, by the left-hand portion 216a of the rear yoke, and by the left-hand column 220a. The right-hand magnetic circuit 206b is formed by the front yoke 210, by the central column 225, by the right-hand portion 216b of the rear yoke, and by the right-hand column 220b. This structure advantageously enables the magnetic flux to be conveyed in an optimal manner and continuously in the two circuits 206a and 206b. The present invention also may be implemented with a magnetic core of a different shape or with two (or more) separate magnetic cores.

Each magnetic circuit 206a, 206b is interrupted by an air-gap 230a, 230b disposed in the vicinity of an upper free surface of the chip 200 and preferably formed between the central column 225 and the opening 223. The air-gaps 230a and 230b are aligned transversely relative to a longitudinal axis 233 of the track 117 and their total length is slightly greater than the width of the track 117. Each air-gap 230a, 230b enables the respective circuit 206a, 206b to be coupled magnetically with a corresponding portion of a facing memory cell 234; in particular, the left-hand air-gap 230a and the right-hand air-gap 230b are coupled with a left-hand portion 234a and with a right-hand portion 234b of the memory cell 234, respectively, the portions 234a and 234b being arranged transversely relative to the axis 233.

Each magnetic circuit 206a, 206b is interrupted by a further air-gap 235a, 235b. For example, the air-gap 235a is formed in the left-hand column 220a and the air-gap 235b is formed in the right-hand column 220b. A respective magnetoresistor 250a, 250b which has a resistance variable in dependence on an external magnetic field, is disposed in the vicinity of each air-gap 235a, 235b so as to be linked at least partially with the magnetic circuit 206a, 206b. The magnetoresistor 250a, 250b is made, for example, of permalloy or is a spin-valve magnetoresistor. Two pairs of contact electrodes 255a, 256a and 255b, 256b (for example, made of copper) are connected to the respective magnetoresistors 250a and 250b in the vicinity of their longitudinal ends. The magnetic flux generated by the portion 234a, 234b of the memory cell 234 is conveyed in the magnetic circuit 206a, 206b and is linked at least partially with the magnetoresistor 250a, 250b. If a certain voltage (for example, of the order of a few mV) is applied between each pair of electrodes 255a, 256a and 255b, 256b and the corresponding current is measured, it is possible to obtain the intensity of the magnetic field in the magnetoresistor 250a, 250b, from which a value indicative of the magnetization state of the portion 234a, 234b of the memory cell 234 can be inferred.

Alternatively, other equivalent means can be used for detecting the magnetic field, such as, for example, a coil wound around each of the magnetic circuits. In this case, each variation of the magnetization state of the memory cells causes a variation in the magnetic flux linked with the coils. An induced electromotive force, from which the variation of the magnetization state of the memory cell can be inferred, therefore is produced at the terminals of each coil. The present invention also may be implemented with different positioning of the air-gaps, with the use of three or more air-gaps (and corresponding magnetoresistors) for reading a corresponding number of portions of the memory cell, or with other equivalent partial reading means.

During a reading operation, the values detected by the magnetoresistors 250a and 250b are added together in the analog/digital circuit (145 in FIG. 1) so as to produce a total value indicative of the magnetization state of the memory cell 234.

When the head 130 is positioned correctly in the centre of the track 117, each air-gap 230a, 230b is linked with the magnetic field generated by the corresponding portion 234a, 234b of the memory cell 234. In this situation, the magnetic flux conveyed in each of the circuits 206a and 206b is the same so that the magnetoresistors 250a, 250b detect the same value.

If the head 130 is not centred on the track 117, however, the values detected by the magnetoresistors 250a, 250b are different. For example, a situation in which the head 130 is displaced towards the left may be considered; in this case, the right-hand air-gap 230b is linked to a greater extent with the magnetic field generated by the memory cell 234, whereas the left-hand air-gap 230a is linked with the magnetic field to a lesser extent. Upon the assumption, for simplicity, that the surface of the disk adjacent the track 117 is not magnetized, the value detected by the right-hand magnetoresistor 250b will increase, whereas the value detected by the left-hand magnetoresistor 250a will decrease in dependence on the magnitude of the displacement of the head 130 towards the left. It should be noted that, if the surface adjacent the track 117 is magnetized, for example, if the tracks are very close together, the value detected by the left-hand magnetoresistor 250a will vary in an unpredictable manner. The magnitude of the variation of the value detected by the left-hand magnetoresistor 250a, however, has a random statistical distribution so that its mean value is zero. The mean of the values detected by the left-hand magnetoresistor 250a will therefore decrease, as in the previous case. Similar considerations apply if the head 130 is displaced towards the right.

The values detected by the magnetoresistors 250a and 250b are compared in the analog/digital circuit 145 (see FIG. 1 again); the result of this comparison is supplied to the control unit 150 which derives the direction and magnitude of the displacement of the head 130 from this result and sends suitable control signals to the actuator 135 for consequent correction of the position of the head 130.

With regard to writing operations, a conventional electromagnetic writing head is used, fixed to one or more of the reading heads described above, for example, arranged in alignment along the track or transverse the track. During a writing operation on a certain track, the reading heads simultaneously read the same track or one or more adjacent tracks so as to check their position, as in the previous case, and consequently also the position of the writing head. Alternatively, the head described above is a reading and writing head which also includes a copper coil or other equivalent conductive means, wound in a spiral around the magnetic core. In this case, each writing operation is interrupted after a predetermined period of time to allow the head to correct its position.

Figure 3A:
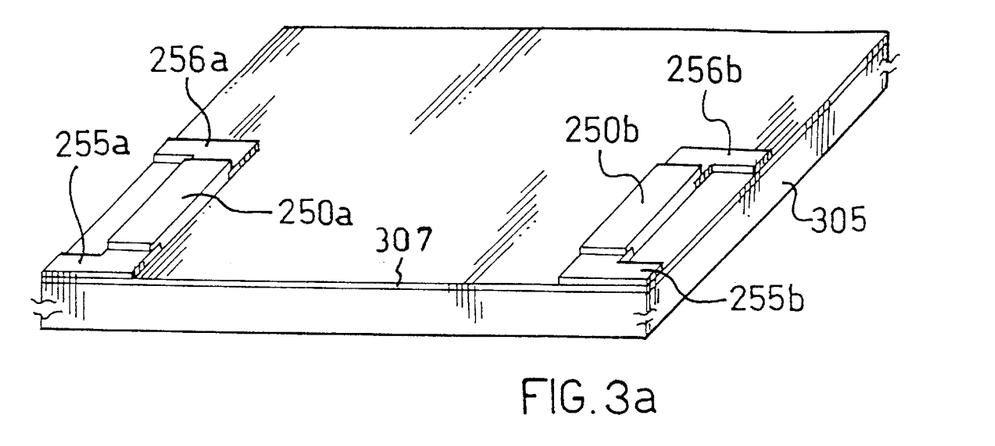
FIGS. 3a–3d show the various steps of a process for producing the head of FIG. 2.

An example of a process for producing the electromagnetic head described above is illustrated in FIGS. 3a–3d (the elements already shown in FIG. 2 are identified by the same reference numerals). With reference in particular to FIG. 3a, a substrate 305 of semiconductor material (for example silicon) is covered with a layer of insulating material 307 (typically silicon dioxide). The electrodes 255a, 256a, 255b, 256b are formed on the insulating layer 307 by known deposition and selective etching techniques. A thin film of magnetoresistive material with a thickness, for example, of between 50 and 100 nm is then deposited, preferably by means of an anodic sputtering process. The magnetoresistors 250a, 250b are formed from this magnetoresistive film by known masking and etching techniques.

Figure 3B:
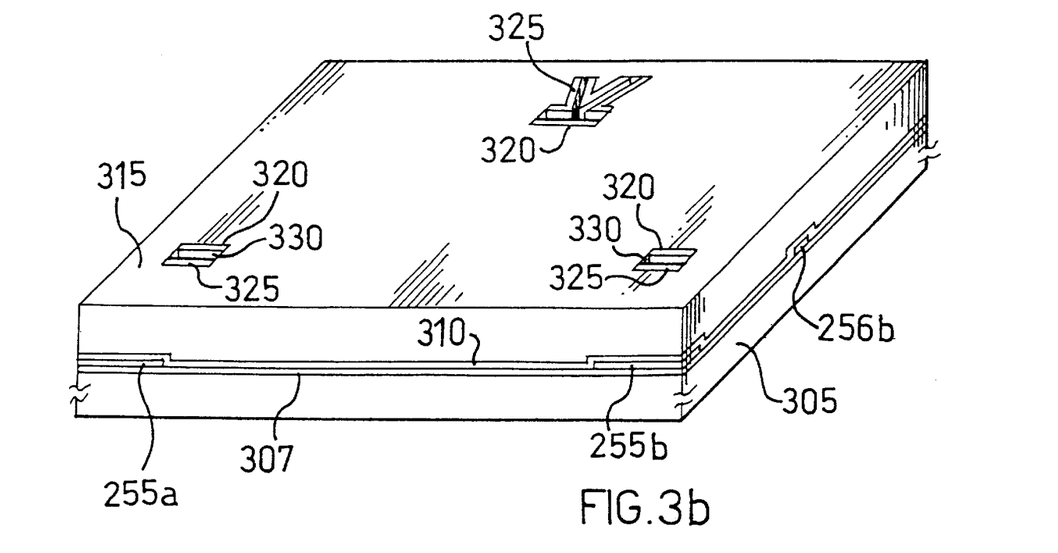

To go on to FIG. 3b, a film 310 of insulating material 310 such as silicon carbide with a thickness, for example, of a few hundreds of nm is deposited. The insulating film 310 (and the other insulating layers described below) are preferably deposited by plasma deposition. A different insulating layer 315, for example, of tetraethyl orthosilicate oxide (TEOS) with a thickness, for example, of a few $\mu$m is deposited on the insulating film 310. Openings 320 with a width, for example, of between 0.8 and 1.2 $\mu$m, are formed in the TEOS layer 315 by known masking and etching techniques and are used (as described below) for forming the various air-gaps (230a, 230b, 235a and 235b in FIG. 2) and the opening in the magnetic core (223 in FIG. 2). A different insulating layer 325, for example, of silicon nitride is deposited and then defined, for example, by anisotropic etching in plasma so as to form a spacer which forms, in each opening 320, a slot 330 with a width of, for example, 0.2 $\mu$m.

Figure 3C:
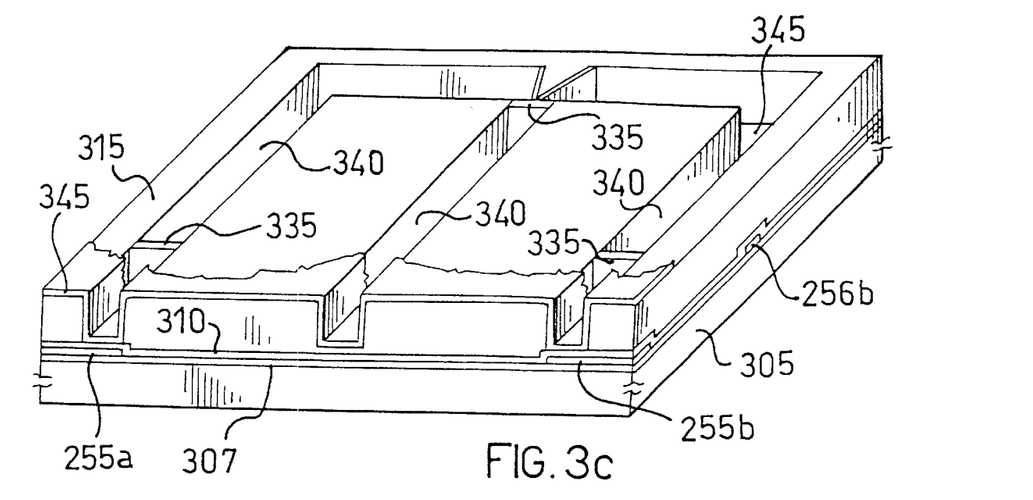

With reference now to FIG. 3c, the process continues with the deposition of a further layer of silicon carbide which fills the slots 330 and covers the entire surface of the TEOS layer 315. This layer of silicon carbide is then etched and removed completely from the surface of the TEOS layer 315 so as to define silicon carbide pillars 335 in the slots 330. It should be noted that the preceding step of etching the silicon nitride layer advantageously improves the mechanical anchorage of the pillars 335 since a single structure is formed with the similarly-formed silicon carbide layer 310. The spacers (325 in FIG. 3b) are then removed, preferably by means of a wet etching process. The TEOS layer 315 is then defined by known masking and selective etching techniques so as to form openings 340 corresponding to the magnetic core (205 in FIG. 1). A film 345 of conductive material (such as tungsten or chromium) with a thickness, for example, of between 50 and 100 nm, is then deposited, preferably by an anodic sputtering process.

Figure 3D:
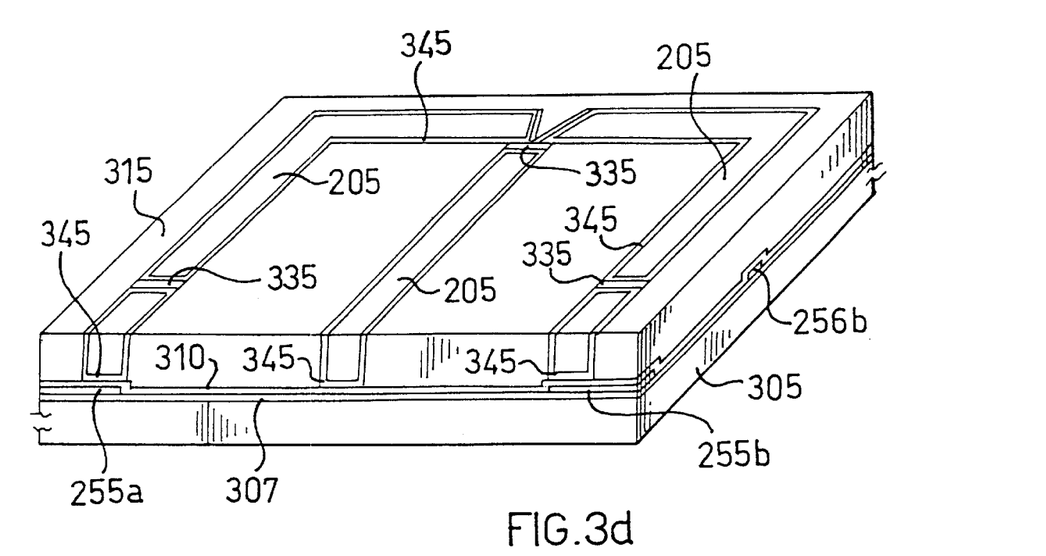

To go on to FIG. 3d, a permalloy layer with a thickness, for example, of a few $\mu$m is grown electrolytically on the conductive film 345 in the openings 340 so as to produce the magnetic core 205 of the structure shown in FIG. 2. Finally, the permalloy layer is subjected to a chemical-mechanical polishing process to remove the exposed portion of the conductive film 345.

Naturally, in order to satisfy contingent and specific requirements, an expert in the art may apply to the above-described head and method for manufacturing the head many modifications and variations all of which, however, are included within the scope of protection of the invention as defined by the following claims.

We claim:

1. A head (130) for a disk storage device (100) having a plurality of tracks (117) divided into memory cells (234), the head (130) comprising:

means (205, 230a, 230b, 250a, 250b) for reading the memory cells (234) in succession, including at least two partial reading means (206a, 230a, 250a; 206b, 230b, 250b) each for reading portions (234a; 234b) of each memory cell (234), the portions (234a; 234b) being arranged transversely relative to a longitudinal axis (233) of the corresponding track (117), each of the partial reading means (206a, 230a, 250a; 206b, 230b, 250b) comprises:

a magnetic circuit (206a; 206b) having a magnetic core interrupted by an air-gap (230a; 230b) and coupled magnetically with the memory cell (234) being read; and means (250a; 250b), linked at least partially with the magnetic circuit (206a; 206b), for detecting a value indicative of the magnetization state of the memory cell (234);

wherein the head (130) is formed in a chip (200) of semiconductor material, each air-gap (230a; 230b) being disposed in the vicinity of a free surface of the chip (200).

2. The head (130) according to claim 1, in which each magnetic circuit (206a; 206b) is interrupted by a further air-gap (235a; 235b), the detection means (250a; 250b) including a magnetoresistor disposed in the vicinity of the further air-gap (235a; 235b).

3. The head (130) according to claim 1, in which the storage device is a hard disk.

4. A head (130) for a disk storage device (100) having a plurality of tracks (117) divided into memory cells (234), the head (130) comprising:

means (205, 230a, 230b, 250a, 250b) for reading the memory cells (234) in succession, including at least two partial reading means (206a, 230a, 250a; 206b, 230b, 250b) each for reading portions (234a; 234b) of each memory cell (234), the portions (234a; 234b) being arranged transversely relative to a longitudinal axis (233) of the corresponding track (117), each of the partial reading means (206a, 230a, 250a; 206b, 230b, 250b) comprises:

a magnetic circuit (206a; 206b) having a magnetic core interrupted by an air-gap (230a; 230b) and coupled magnetically with the memory cell (234) being read; and means (250a; 250b), linked at least partially with the magnetic circuit (206a; 206b), for detecting a value indicative of the magnetization state of the memory cell (234);

wherein the magnetic cores of the two partial reading means are formed by a single core (205) of magnetic material.

5. The head (130) according to claim 4, in which the single magnetic core (205) includes:

a first yoke (210);

a second yoke divided into a first portion (216a) and a second portion (216b) which are spaced from one another;

a first column (220a) and a second column (220b) connecting the first yoke (210) to the first portion (216a) and to the second portion (216b) of the second yoke, respectively; and a central column (225) extending from the first yoke (210) to the vicinity of respective free ends of the first portion (216a) and the second portion (216b) of the second yoke, such that the magnetic circuit (206a) of a first of the two partial reading means is formed by the first yoke (210), the central column (225), the first portion (216a) of the second yoke, and the first column (220a), and the magnetic circuit (206b) of a second of the two partial reading means is formed by the first yoke (210), the central column (225), the second portion (216b) of the second yoke, and the second column (220b).

6. The head (130) according to claim 5, in which the first portion (216a) and the second portion (216b) of the second yoke have, at their free ends, respective opposed chamfers forming a V-shaped opening (223) facing outwardly relative to the single magnetic core (205).

7. A disk storage device (100), comprising;
a disk having a plurality of tracks, each track including a plurality of memory cell locations capable of storing data therein;
at least one head (130) comprising:
    means (205, 230a, 230b, 250a, 250b) for reading the memory cells (234) in succession, including at least two partial reading means (206a, 230a, 250a; 206b, 230b, 250b) each for reading portions (234a; 234b) of each memory cell (234), the portions (234a; 234b) being arranged transversely relative to a longitudinal axis (233) of the corresponding track (117) to which the head is adjacent, each of the partial reading means (206a, 230a, 250a; 206b, 230b, 250b) comprises:
        a magnetic circuit (206a; 206b) having a magnetic core interrupted by an air-gap (230a; 230b) and coupled magnetically with the memory cell (234) being read; and
        means (250a; 250b), linked at least partially with the magnetic circuit (206a; 206b), for detecting a value indicative of the magnetization state of the memory cell (234); and
    means (145, 150, 135) for comparing data values read by each of the partial reading means (206a, 230a, 250a; 206b, 230b, 250b) and for correcting the position of the head (130) in dependence on the comparison;
wherein the magnetic cores of the two partial reading means are formed by a single core (205) of magnetic material.

8. The disk storage device (100) according to claim 7, in which the single magnetic core (205) includes:
a first yoke (210);
a second yoke divided into a first portion (216a) and a second portion (216b) which are spaced from one another;
a first column (220a) and a second column (220b) connecting the first yoke (210) to the first portion (216a) and to the second portion (216b) of the second yoke, respectively;
a central column (225) extending from the first yoke (210) to the vicinity of respective free ends of the first portion (216a) and the second portion (216b) of the second yoke, such that the magnetic circuit (206a) of a first of the two partial reading means is formed by the first yoke (210), the central column (225), the first portion (216a) of the second yoke, and the first column (220a), and the magnetic circuit (206b) of a second of the two partial reading mean is formed by the first yoke (210), the central column (225), the second portion (216b) of the second yoke, and the second column (220b).

9. The disk storage device (100) according to claim 8, wherein the first portion (216a) and the second portion (216b) of the second yoke have, at their free ends, respective opposed chamfers forming a V-shaped opening (223) facing outwardly relative to the single magnetic core (205).

10. The disk storage device (100) according to claim 7, wherein each magnetic circuit (206a; 206b) is interrupted by a further air-gap (235a; 235b), the detection means (250a; 250b) including a magnetoresistor disposed in the vicinity of the further air-gap (235a; 235b).

11. The disk storage device (100) according to claim 7, in which the storage device (100) is a hard disk.

12. A disk storage device (100), comprising;
a disk having a plurality of tracks, each track including a plurality of memory cell locations capable of storing data therein;
at least one head (130) comprising:
    means (205, 230a, 230b, 250a, 250b) for reading the memory cells (234) in succession, including at least two partial reading means (206a, 230a, 250a; 206b, 230b, 250b) each for reading portions (234a; 234b) of each memory cell (234), the portions (234a; 234b) being arranged transversely relative to a longitudinal axis (233) of the corresponding track (117) to which the head is adjacent, each of the partial reading means (206a, 230a, 250a; 206b, 230b, 250b) comprises:
        a magnetic circuit (206a; 206b) having a magnetic core interrupted by an air-gap (230a; 230b) and coupled magnetically with the memory cell (234) being read; and
        means (250a; 250b), linked at least partially with the magnetic circuit (206a; 206b), for detecting a value indicative of the magnetization state of the memory cell (234); and
    means (145, 150, 135) for comparing data values read by each of the partial reading means (206a, 230a, 250a; 206b, 230b, 250b) and for correcting the position of the head (130) in dependence on the comparison;
wherein the head (130) is formed in a chip (200) of semiconductor material, each air-gap (230a; 230b) being disposed in the vicinity of a surface of the chip (200).

13. A head for reading data stored in tracks on a memory disk of a disk drive, comprising:
a first magnetic circuit magnetically coupled to a memory location on a track of the memory disk to which the head is adjacent, including an electrical component having an electrical characteristic corresponding to a value of a data value stored in the memory location;
a second magnetic circuit magnetically coupled to the memory location on the track of the memory disk to which the head is adjacent, including an electrical component having an electrical characteristic corresponding to a value of a data value stored in the memory location, a difference in magnitude of the electrical characteristic corresponding to the first magnetic circuit and the electrical characteristic corresponding to the second magnetic circuit representing a lateral displacement of the head relative to a longitudinal axis of the track;

wherein the first and second magnetic circuits form a magnetic core, the magnetic core comprising:
 a front segment that is positioned substantially perpendicular to the longitudinal axis of the track during a memory access operation and having first and second ends;
 first and second side segments extending from the first and second ends of the front segment, respectively;
 a center segment extending from a central portion of the front segment between the first and second side segments; and
 first and second rear segments extending from the first and second side segments, respectively, towards the center segment, at least one air gap existing between unconnected end portions of the first rear segment, the second rear segment and the center segment.

14. The head of claim 13, wherein the first magnetic circuit is formed by the first side segment, the center segment, the first rear segment and a portion of the front segment between the first side segment and the center segment.

15. The head of claim 14, wherein:
 the first side segment comprises a first portion extending from the front segment and a second portion extending from the first rear segment, an air gap existing between unconnected ends of the first and second portions of the first side segment; and
 the electrical component of the first magnetic circuit is disposed in the vicinity of the air gap between the unconnected ends of the first and second portions of the first side segment.

16. The head of claim 15, wherein:
 the electrical component of the first magnetic circuit comprises a magnetoresistive element having a resistive value dependent upon a magnetic field in the first magnetic circuit.

17. The head of claim 14, wherein the second magnetic circuit is formed by the second side segment, the center segment, the second rear segment and a portion of the front segment between the second side segment and the center segment.

18. The head of claim 17, wherein:
 the second side segment comprises a first portion extending from the front segment and a second portion extending from the second rear segment, an air gap existing between unconnected ends of the first and second portions of the second side segment; and
 the electrical component of the second magnetic circuit is disposed in the vicinity of the air gap between the unconnected ends of the first and second portions of the second side segment.

19. The head of claim 18, wherein:
 the electrical component of the second magnetic circuit comprises a magnetoresistive element having a resistive value dependent upon a magnetic field in the second magnetic circuit.

20. A disk drive device, comprising:
a disk having a plurality of tracks defined along a surface of the disk in which data is stored; a head magnetically coupled and disposed in proximity to the surface of the disk, the head comprising:
 a magnetic core having a first portion and a second portion, each of the first and second portions being magnetically coupled to the disk at the track location to which the head is adjacent and including at least one gap of substantially non-magnetic material, at least one segment of the magnetic core being shared by both the first and second portions thereof;
 a first component coupled to the first portion of the magnetic core so that an electrical characteristic of the first component is representative of the data stored in the track location to which the head is adjacent; and
 a second component coupled to the second portion of the magnetic core so that an electrical characteristic of the second component is representative of the data stored in the track location to which the head is adjacent;
a suspension arm assembly coupled to the head;
an actuator coupled to the suspension arm and capable of receiving one or more control signals for selectively positioning the head along the surface of the disk, the one or more control signals being utilized by the actuator and suspension arm to position the head laterally relative to the track to which the head is adjacent; and
a control unit electrically coupled to the head for receiving a plurality of signals therefrom, each signal representing a data value stored in a location of a track adjacent the head, at least one of the signals received by the control unit from the head representing the electrical characteristic of the first component and at least one of the signals received by the control unit from the head representing the electrical characteristic of the second component, and generating the one or more control signals based upon the signals received from the head
wherein the magnetic core comprises:
 a front segment that is positioned substantially perpendicular to a longitudinal axis of the track to which the head is adjacent and having first and second ends;
 first and second side segments extending from the first and second ends of the front segment, respectively;
 a center segment extending from a central portion of the front segment between the first and second side segments; and
 first and second rear segments extending from the first and second side segments, respectively, towards the center segment, at least one second gap existing between unconnected end portions of the first rear segment, the second rear segment and the center segment.

21. The disk drive of claim 20, wherein:
the control unit receives two signals from the head; and
the value of the one or more control signals is based upon a difference in magnitude between the two signals received from the head.

22. The disk drive of claim 20, wherein:
the control unit receives two signals from the head; and
the value of the one or more control signals is based upon a difference in mean value between the two signals received from the head.

23. The disk drive of claim 20, wherein:
the first and second components comprise electromagnetic resistors.

24. The disk drive of claim 20, wherein:
the first side segment comprises a first portion extending from the front segment and a second portion extending from the first rear segment, the at least one gap of the first portion existing between unconnected ends of the first and second portions of the first side segment; and the first component is disposed in the vicinity of the at least one gap of the first portion between the unconnected ends of the first and second portions of the first side segment and adapted to sense a magnetic field associated therewith.

25. The disk drive of claim 24, wherein:

the second side segment comprises a first portion extending from the front segment and a second portion extending from the first rear segment, the at least one gap of the second portion existing between unconnected ends of the first and second portions of the second side segment; and the second component is disposed in the vicinity of the at least one gap of the second portion between the unconnected ends of the first and second portions of the second side segment and adapted to sense a magnetic field associated therewith.

26. The disk drive of claim 20, wherein:

the one or more control signals are utilized by the actuator and suspension arm to position the head laterally relative to the track to which the head is adjacent.

27. The disk drive of claim 20, wherein:

the signals received by the control unit from the head comprise two signals; and the one or more control signals generated by the control unit is based upon a difference between the two signals received by the control unit from the head.

28. The disk drive of claim 20, wherein:

the signals received by the control unit from the head comprise two signals; and the one or more control signals generated by the control unit is based upon a difference between the magnitude of the two signals received by the control unit from the head.

29. The disk drive of claim 20, wherein:

the signals received by the control unit from the head comprise two signals; and the one or more control signals generated by the control unit is based upon a difference between the mean value of two signals received by the control unit from the head.

30. The disk drive of claim 20, wherein:

the head is formed as part of an integrated circuit.

* * * * *

UNITED STATES PATENT AND TRADEMARK OFFICE
CERTIFICATE OF CORRECTION

PATENT NO. : 6,532,130 B1
DATED : March 11, 2003
INVENTOR(S) : Bruno Murari et al.

It is certified that error appears in the above-identified patent and that said Letters Patent is hereby corrected as shown below:

<u>Title page, Item [54] and Column 1, lines 1 and 2,</u>
Replace "HEAD FOR READING MAGNETICALLY STORED DATA" with
-- READ HEAD FOR READING MAGNETICALLY STORED DATA --

<u>Column 11,</u>
Lines 6 thru 22, replace "The disk drive of claim 24, wherein: the second side segment comprises a first portion extending from the front segment and a second portion extending from the first rear segment, the at least one gap of the second portion existing between unconnected ends of the first and second portions of the second side segment; and the second component is disposed in the vicinity of the at least one gap of the second portion between the unconnected ends of the first and second portions of the second side segment and adapted to sense a magnetic field associated therewith." with -- The disk drive of claim 53, wherein: the second side segment comprises a first segment portion extending from the front segment and a second segment portion extending from the first rear segment, the gap of the second side segment existing between unconnected ends of the first and second segment portions of the second side segment; and the second component is disposed in the vicinity of the gap of the second side segment between the unconnected ends of the first and second segment portions of the second side segment and adapted to sense a magnetic field associated therewith. --

Signed and Sealed this

Twenty-seventh Day of April, 2004

JON W. DUDAS
*Acting Director of the United States Patent and Trademark Office*